US008018632B2

(12) United States Patent
Walker et al.

(10) Patent No.: US 8,018,632 B2
(45) Date of Patent: Sep. 13, 2011

(54) SCANNER/IMAGER

(75) Inventors: Jon L. Walker, Riverton, WY (US);
Eric Wolfe, Riverton, WY (US); Jeffery C. Cooper, Riverton, WY (US); Stephen R. Watkins, Riverton, WY (US); Kevin Kershisnik, Riverton, WY (US); Rocky L. Harting, Lander, WY (US)

(73) Assignee: Pertech Resources, Inc., Riverton, WY (US)

( * ) Notice: Subject to any disclaimer, the term of this patent is extended or adjusted under 35 U.S.C. 154(b) by 977 days.

(21) Appl. No.: 11/983,699

(22) Filed: Nov. 9, 2007

(65) Prior Publication Data
US 2008/0130070 A1 Jun. 5, 2008

Related U.S. Application Data

(60) Provisional application No. 60/858,003, filed on Nov. 9, 2006.

(51) Int. Cl.
*H04N 1/04* (2006.01)

(52) U.S. Cl. ......... 358/498; 358/496; 358/400; 358/474

(58) Field of Classification Search .................. 358/498, 358/496, 400, 474
See application file for complete search history.

(56) References Cited

U.S. PATENT DOCUMENTS

| 4,044,881 | A |   | 8/1977  | Chai et al.          |
| 4,069,755 | A |   | 1/1978  | Beery                |
| 4,076,111 | A |   | 2/1978  | Robinson et al.      |
| 4,179,223 | A |   | 12/1979 | Kwan et al.          |
| 4,220,084 | A |   | 9/1980  | Maclean et al.       |
| 4,338,035 | A |   | 7/1982  | Kondo et al.         |
| 4,602,882 | A |   | 7/1986  | Akazawa              |
| 4,643,596 | A |   | 2/1987  | Shimada et al.       |
| 4,901,158 | A |   | 2/1990  | Sato et al.          |
| 4,933,536 | A |   | 6/1990  | Lindemann et al.     |
| 5,074,690 | A |   | 12/1991 | Del Signore, II et al. |
| 5,497,250 | A |   | 3/1996  | Kawashima            |
| 5,535,022 | A |   | 7/1996  | Itoigawa             |
| 5,659,403 | A | * | 8/1997  | Itoigawa ........................ 358/474 |
| 5,754,673 | A |   | 5/1998  | Brooks et al.        |
| 5,789,727 | A |   | 8/1998  | Teradaira et al.     |
| 5,825,946 | A |   | 10/1998 | Del Signore, II et al. |
| 6,059,185 | A |   | 5/2000  | Funk et al.          |

(Continued)

FOREIGN PATENT DOCUMENTS
WO          WO 9738402          10/1997

*Primary Examiner* — Houshang Safaipour
(74) *Attorney, Agent, or Firm* — Tarolli, Sundheim, Covell & Tummiho LLP

(57) ABSTRACT

An apparatus and method for scanning documents such as ID cards and bank checks that includes hinged cover and base assemblies. The base includes motor driven drive rollers for conveying a document along a paper path defined between the cover and base. The cover includes a plurality of pinch rollers forming part of a floating deck that is carried by cover structure and which is spring biased towards the base assembly. Two side-by-side scanning regions are provided, one of which is configured to scan flexible documents, the other of which is configured to scan rigid media such ID cards. Sensors detect the position of the document. A solenoid driven, replaceable ink stamp imprints a document to indicate that it has been scanned. A weight biased diverter is deflected by rigid documents to enable exit through a slot. An entrance guide includes an offset guide wall to improve feeding.

21 Claims, 14 Drawing Sheets

U.S. PATENT DOCUMENTS

| | | | |
|---|---|---|---|
| 6,171,002 B1 | 1/2001 | Momose et al. | |
| 6,328,394 B1 * | 12/2001 | Shirai et al. | 347/2 |
| 6,433,897 B1 * | 8/2002 | Wilcox et al. | 358/498 |
| 6,473,519 B1 | 10/2002 | Pidhirny et al. | |
| 6,547,132 B1 | 4/2003 | Templeton et al. | |
| 6,644,546 B2 | 11/2003 | George et al. | |
| 6,705,224 B2 | 3/2004 | Kuroda et al. | |
| 6,722,754 B1 | 4/2004 | Delaney et al. | |
| 6,837,424 B2 | 1/2005 | Young et al. | |
| 6,902,105 B2 | 6/2005 | Koakutsu | |
| 6,966,554 B2 | 11/2005 | Panini et al. | |
| 7,010,155 B2 | 3/2006 | Koakutsu et al. | |
| 7,124,936 B2 | 10/2006 | Templeton et al. | |
| 7,182,249 B2 | 2/2007 | Johannesson et al. | |
| 7,219,831 B2 | 5/2007 | Murata | |
| 7,477,427 B2 | 1/2009 | Fujikawa et al. | |
| 2004/0251588 A1 | 12/2004 | Panini et al. | |
| 2004/0257626 A1 | 12/2004 | Panini et al. | |
| 2005/0041268 A1 | 2/2005 | Panini | |
| 2005/0127590 A1 | 6/2005 | Ugo et al. | |
| 2005/0267843 A1 | 12/2005 | Acharyn et al. | |
| 2006/0115312 A1 | 6/2006 | Furihata et al. | |

* cited by examiner

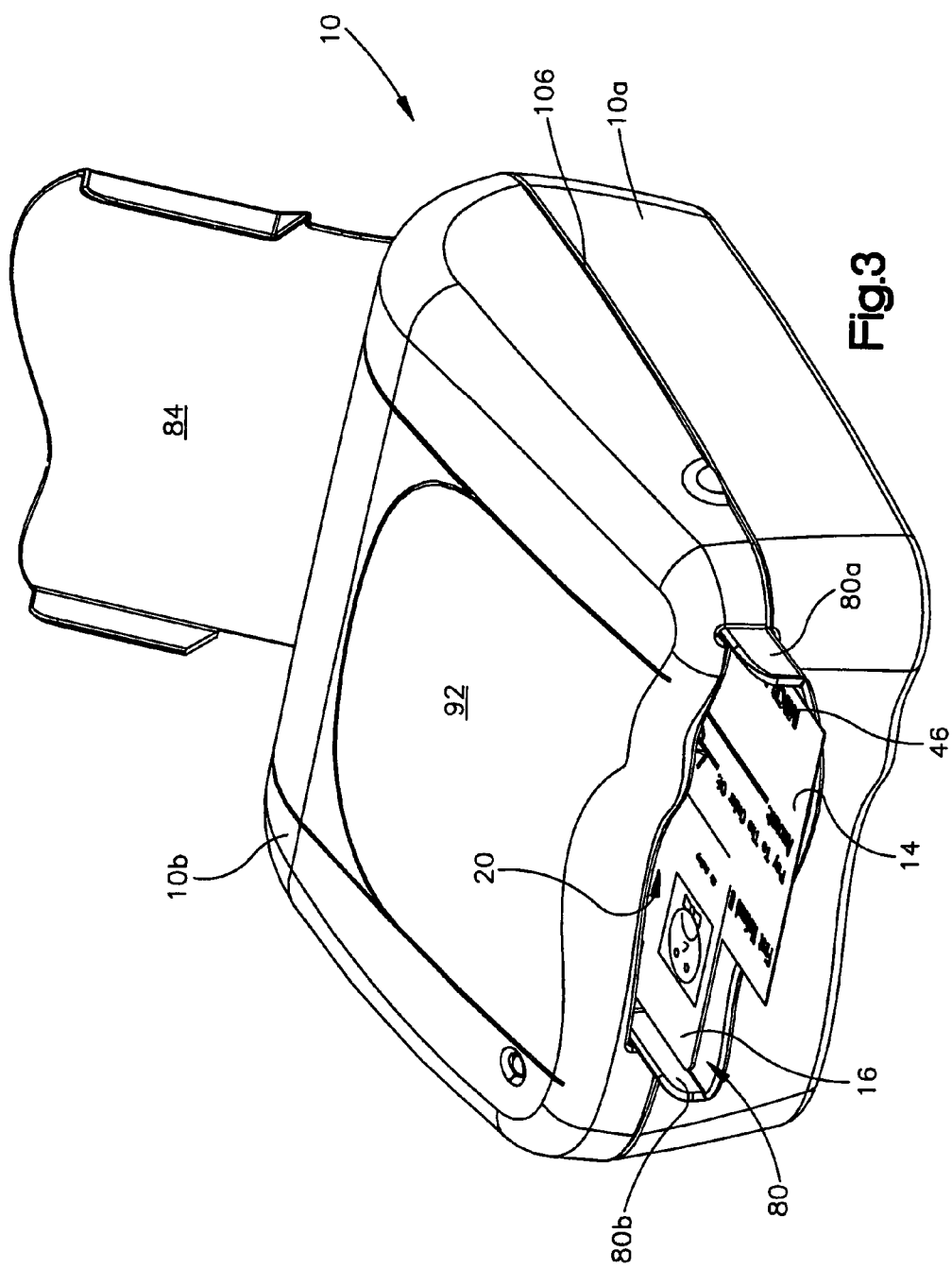

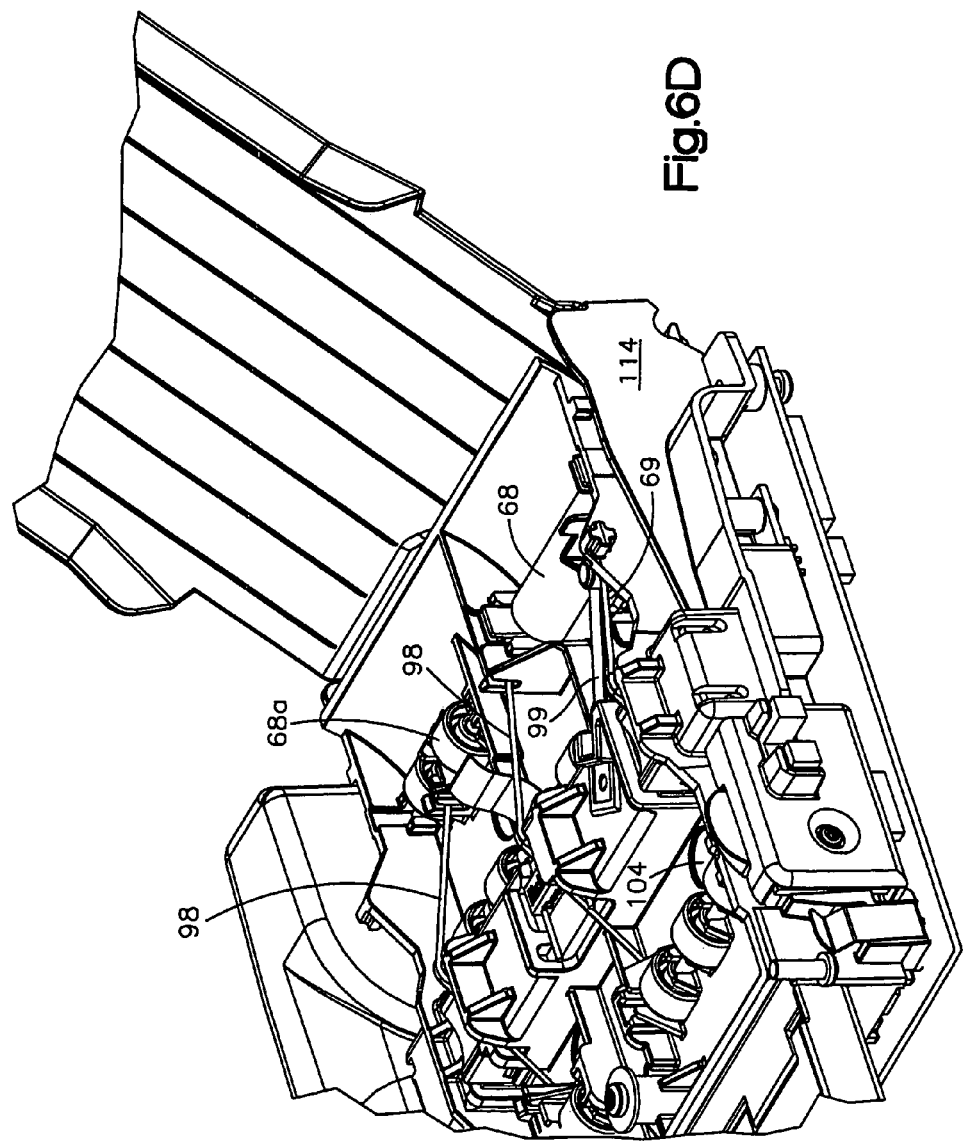

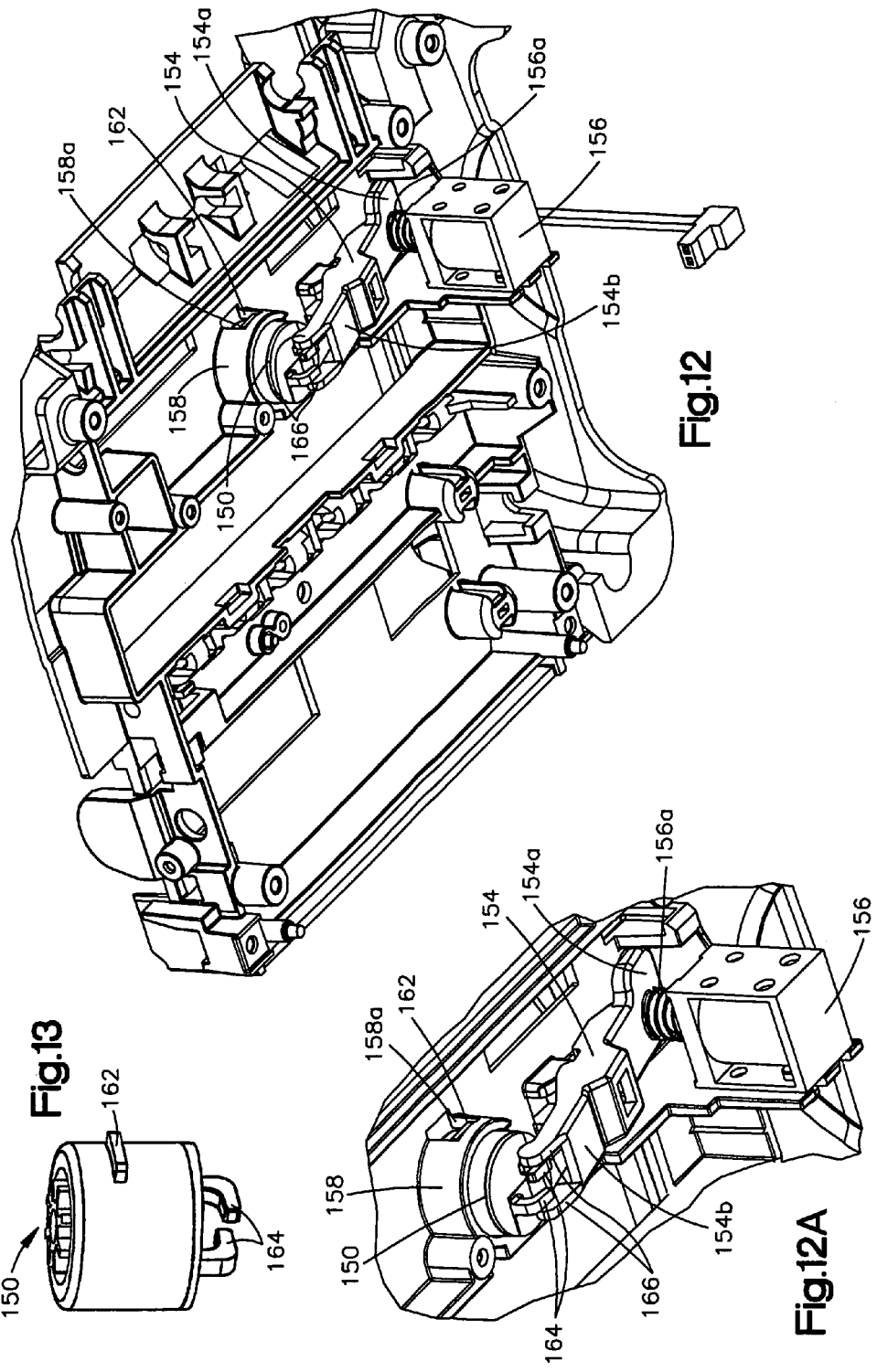

SCANNER/IMAGER

REFERENCE TO A PRIOR APPLICATION

This application claims the benefit of U.S. Provisional Application No. 60/858,003, filed Nov. 9, 2006.

TECHNICAL FIELD

The present invention relates generally to scanning and document verification/authentication and in particular, to a method and apparatus for scanning and verifying/authenticating paper documents such as checks as well as rigid cards such as ID cards, driver licenses, credit cards, etc.

BACKGROUND ART

Historically, consumer checks presented to purchase an item(s) in a store, or, other small business required considerable handling. A presented check often required the store owner to be called upon (rather than the clerk) to authenticate. Accepted checks, then, at the end of the day were taken to the bank for deposit.

SUMMARY OF THE INVENTION

The present invention provides a new and improved apparatus and method for scanning and/or verifying/authenticating paper documents such as checks as well as rigid cards such as ID cards, driver licenses, credit cards, etc. The illustrated apparatus comprises a compact/stand-alone scanner/imager that can scan both sides of a document in a single pass. The apparatus may also include MICR read capability and/or magnetic stripe read capability. In addition, the apparatus may optionally include an ink stamp mechanism for stamping indicia on the document being scanned to, in effect, "cancel" the document or, in other words, mark it with indicia to indicate that it has been processed. The illustrated apparatus may function in conjunction with a host system and can handle IDs, checks, driver licenses, credit cards and other paper/card based media.

According to a preferred embodiment, the apparatus includes a cover assembly and a base assembly hingedly connected at one end to provide a clam shell type configuration. The base assembly includes at least one motor driven roller for conveying a document to be scanned along a paper path defined between the cover assembly and the base assembly. The cover assembly includes at least one pinch roller associated with the drive roller. When the cover is closed, the pinch roller confrontingly engages the drive roller in order to grip and drive a document along the paper path.

In the preferred and illustrated embodiment, the paper path defines two side-by-side scanning regions, one of which is configured to scan flexible documents such as bank checks, whereas the other of the regions is configured to scan rigid media such as ID cards. A plurality of sensors located in the scan regions are operative to detect the position of the document being scanned whereby movement of the document through a given scan region is controlled.

According to a feature of the invention, the base assembly includes a plurality of concurrently driven drive rollers and the cover assembly includes a plurality of associated pinch rollers. Preferably, the pinch rollers are mounted in a floating deck assembly that is carried by cover structure forming part of the cover assembly and which includes biasing elements such as springs for urging the deck assembly towards the assembly when the cover is closed.

The disclosed apparatus or machine can provide for the remote, automatic, deposit of a check to a bank electronically. Electronic image data can be created from the inserted document(s), and, forwarded for processing, authenticating, printing, etc. Preferably, the machine connects to a host through a USB, or alternatively through an ethernet interface. The host may be an on-line service or the regional office of a franchise, or the bank itself. The apparatus can forward ID and/or check images to the host when requested, or, optionally, it can directly forward data to a hub-connected printer. In addition the apparatus can identify inserted documents, detect and report scan errors, re-scan documents as necessary, store image data, and, return documents to the operator. It is feasible to combine the apparatus electrically and mechanically with an auto-feeder at the front and a document sorter to handle documents in volume. Alternatively, the unit can incorporate through its optional com-ports, peripherals such as a pin-pad, a keypad and/or a signature-pad.

Mechanically, the enclosed mechanism has optional mounting configurations available to the user: in a cradle, mounted on edge, on the wall, and, with alternative independent, paper-paths available. This machine can be a vital part of an improved system to receive presented checks for payment in a store, verify their authenticity, and, then instantly, and electronically deposit the checks in the store's bank. Efficiency is improved; fraud is reduced.

According to another embodiment of the invention, the apparatus may include an ink stamping mechanism for stamping indicia on the document being scanned. For example, the ink stamp mechanism may place a check "canceling" indicia on the check as it is being scanned. This indicia permanently marks the check and indicates to anyone handling the check that it has been processed.

According to another feature of the invention, the machine has an improved exit configuration to accommodate both rigid and semi-rigid documents. When a check is processed by the machine, it is deflected upwardly and discharged into a stacking tray. When rigid media, i.e., ID cards are processed, they are ejected from the machine and are not deflected or bent.

Additional features of the invention will become apparent and a fuller understanding obtained in reading the following detailed description made in connection with the accompanying drawings.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 3 is a front perspective view of a scanner/imager embodying the present invention;

FIG. 6D is a fragmentary, perspective view of the scanner/imager with covers removed to show interior detail;

FIG. 12 is a perspective view of an underside of a lower deck forming part of the present invention and showing an ink stamp mechanism;

FIG. 12A is a fragmentary perspective view of the lower deck shown in FIG. 12; and, FIG. 13 is a perspective view of an ink stamp constructed in accordance with a preferred embodiment of the invention.

BEST MODE FOR CARRYING OUT THE INVENTION

Figure 2:
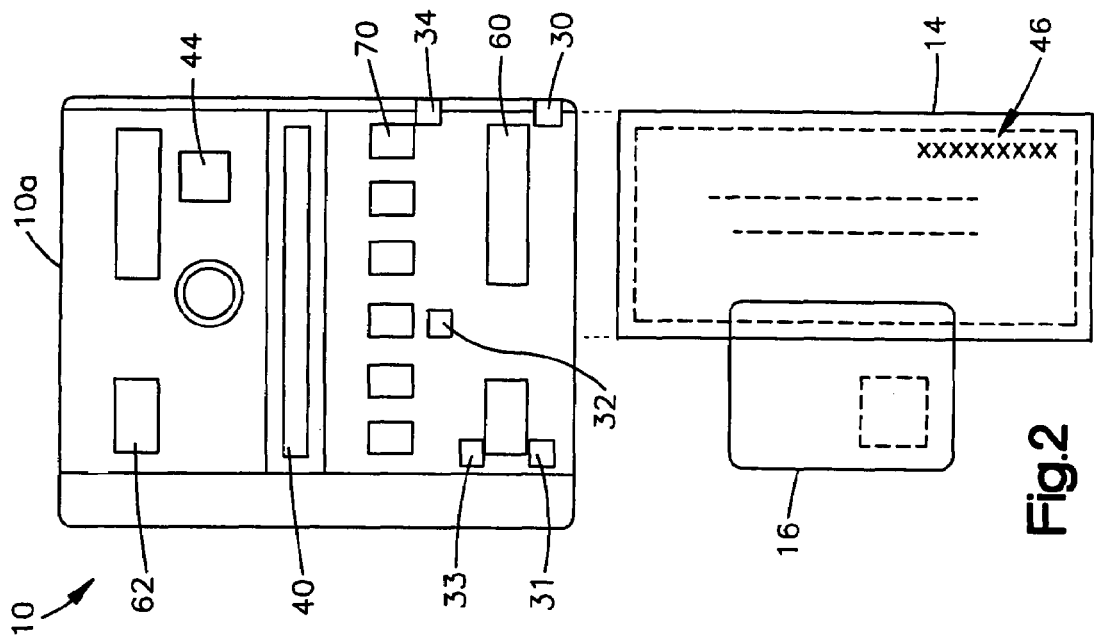
FIG. 2 is a top view shown schematically of the scanner/imager shown in FIG. 1 with a top cover removed.
Figure 1:
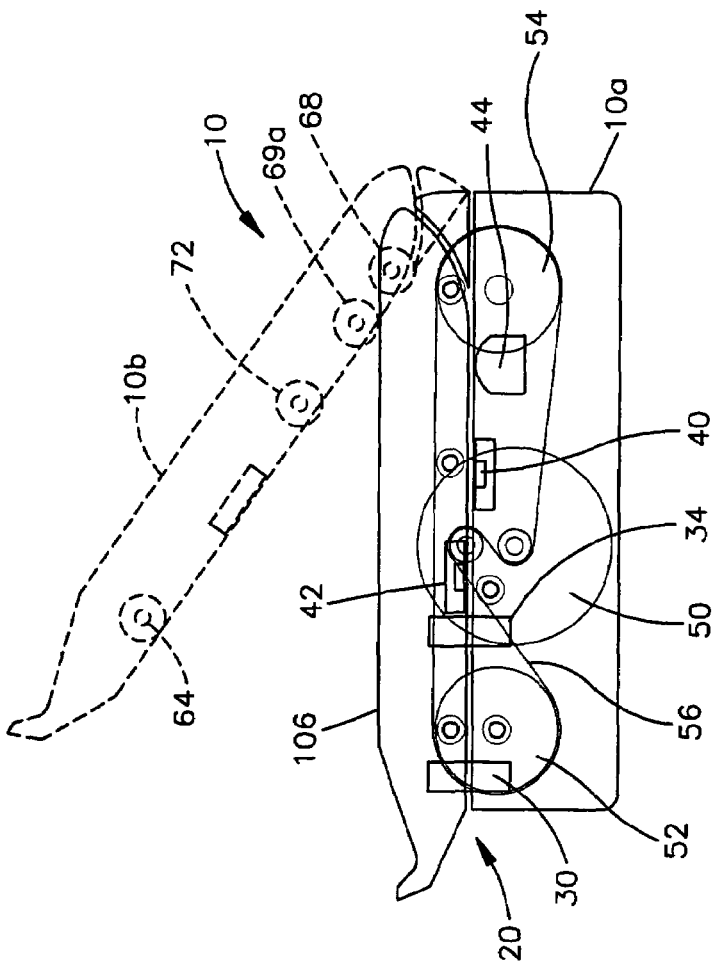
FIG. 1 is a schematic representation of a scanner/imager constructed in accordance with a preferred embodiment of the invention.

FIGS. 1-3, illustrate the overall construction of a scanner/imager constructed in accordance with a preferred embodiment of the invention. In FIGS. 1 and 2, the unit 10 is shown schematically.

Referring first to FIGS. 1 and 2, the scanner/imager 10 is preferably a compact, stand-alone unit that is capable of scanning both sides of a document in a single pass. In addition, the unit preferably has MICR read capability and may also be capable of reading a magnetic stripe forming part of an ID card. The unit 10 is intended to function in conjunction with a host system to handle ID's, checks, driver licenses, credit cards, as well as other documents. In some configurations, the unit, in conjunction with a host computer or system, may provide for the remote, automatic deposit of a check to a bank electronically. It is also capable of creating electronic image data scanned from the document, which may be forwarded for processing, authentication, printing, etc. The unit is preferably connected to a host system through a USB, Ethernet or other interface. The host system may be an online service, a financial institution, i.e. bank or the regional office of a franchise.

The unit 10 includes a base 10a and a cover assembly 10b pivotally connected to the base. Referring to FIG. 2, the unit 10 is capable of reading a paper document such as a 14 check or a rigid card 16 such as an ID card, driver license, credit card, etc.

In the illustrated embodiment, the unit define two scan regions. A check 14 is intended to be read in a right-justified region (as viewed in FIG. 2) of the scanner/imager 10. The rigid ID card 16 is intended to be read in a left-justified region of the scanner. In accordance with this feature, an input slot, indicated generally by the reference character 20 is defined between the cover 10b and the base 10a.

As seen best in FIG. 2, the base 10a mounts a number of sensors used to detect documents and document movement. A sensor 30 and a sensor 31 are mounted at the input slot to detect insertion of a paper document or a rigid card, respectively. A sensor 34 is preferably longitudinally aligned with the sensor 30 and is operative to sense the leading edge of a check 14 being transported through the unit. A sensor 33 controls the positioning of a rigid ID card. A midfield sensor 32 is positioned to sense both a check and a rigid card. It should be noted that in the preferred embodiment, and as seen best in FIG. 2, a lower edge of the rigid ID card and an upper edge of the check overlap, or in other words, pass over the same region where the midfield sensor 32 is located. With this configuration, the midfield sensor may serve to detect skew in the document being scanned by monitoring the inner edge (the edge opposite the edge in contact with the guide) of the document or card being scanned.

According to the invention, the unit 10 is capable of scanning both sides of a check or ID card as it is transported between the base 10a and cover 10b by a transport mechanism to be described. Referring to FIGS. 1 and 2, the base 10a mounts a contact image scanner (CIS) 40 and the cover 10b mounts a substantially similar CIS 42 so that both sides of a document 14 or ID card 16 can be scanned in a single pass through the unit.

In the preferred and illustrated embodiment, the base 10a also mounts a MICR reader 44 which is operative to detect and read the magnetic based characters printed along the bottom of a check. These MICR readable characters are indicated schematically by the reference character 46 in FIGS. 2 and 3.

For purposes of explanation, the document read by the right region (as viewed in FIG. 2) of the unit 10 shall be referred to as a check. The rigid ID card which is capable of being read on the left region of the unit shall be referred to as an ID card. It should be noted, that the disclosed scanner/imager unit 10 is capable of reading various other types of paper documents and rigid cards, including credit cards, and should not be limited to checks or specific types of ID cards.

According to the invention, both sides of the check 14 or ID card 16 that is inserted into the entry slot 20 is scanned and read in a single pass through the machine. The check/ID card is conveyed through the unit by a transport mechanism shown schematically in FIG. 1. The transport mechanism includes a servo/stepper motor 50 that concurrently drives entrance and exit pulleys 52, 54 by means of a drive belt 56. The pulley 52 is operatively connected to a drive roller 60 (shown best in FIG. 2) whereas the exit pulley 54 is operatively connected to an exit drive roller 62. The cover assembly 10b rotatably mounts a pressure roller 64 that is confrontingly engageable with the drive roller 60 when the cover is closed. Similarly, the cover assembly 10b also rotatably mounts a pressure roller 68 that confrontingly engages the exit drive roller 62 when the cover is closed. In other words, the drive roller 60, in conjunction with the pressure roller 64, defines a pinch roller assembly for gripping and moving a check/ID card from the entry slot 20 into the machine. Similarly, the exit drive roller 62, in combination with the pressure roller 68, defines a pinch roller assembly for conveying the check/ID card to an exit slot/exit tray.

The base 10b also mounts a pressure roller 70 which presses the check/ID card into scanning contact with the CIS 42 mounted in the cover 10b. Similarly, the cover 10b mounts a pressure roller 72 which presses the check/ID card into scanning contact with the CIS 40 mounted in the base.

Figure 6:
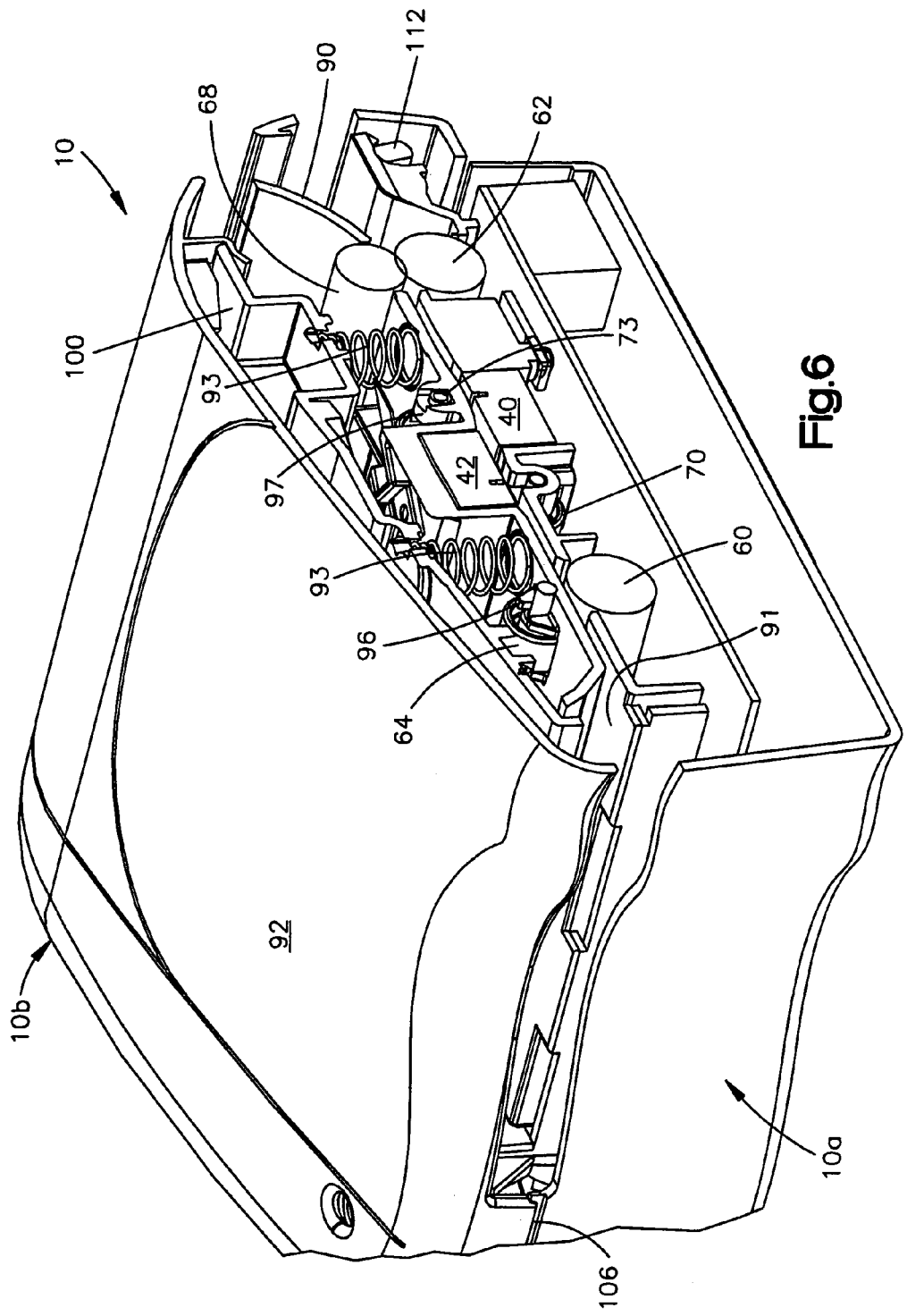
FIG. 6 is another perspective view of the scanner with a side broken away to show interior detail.
Figure 6B:
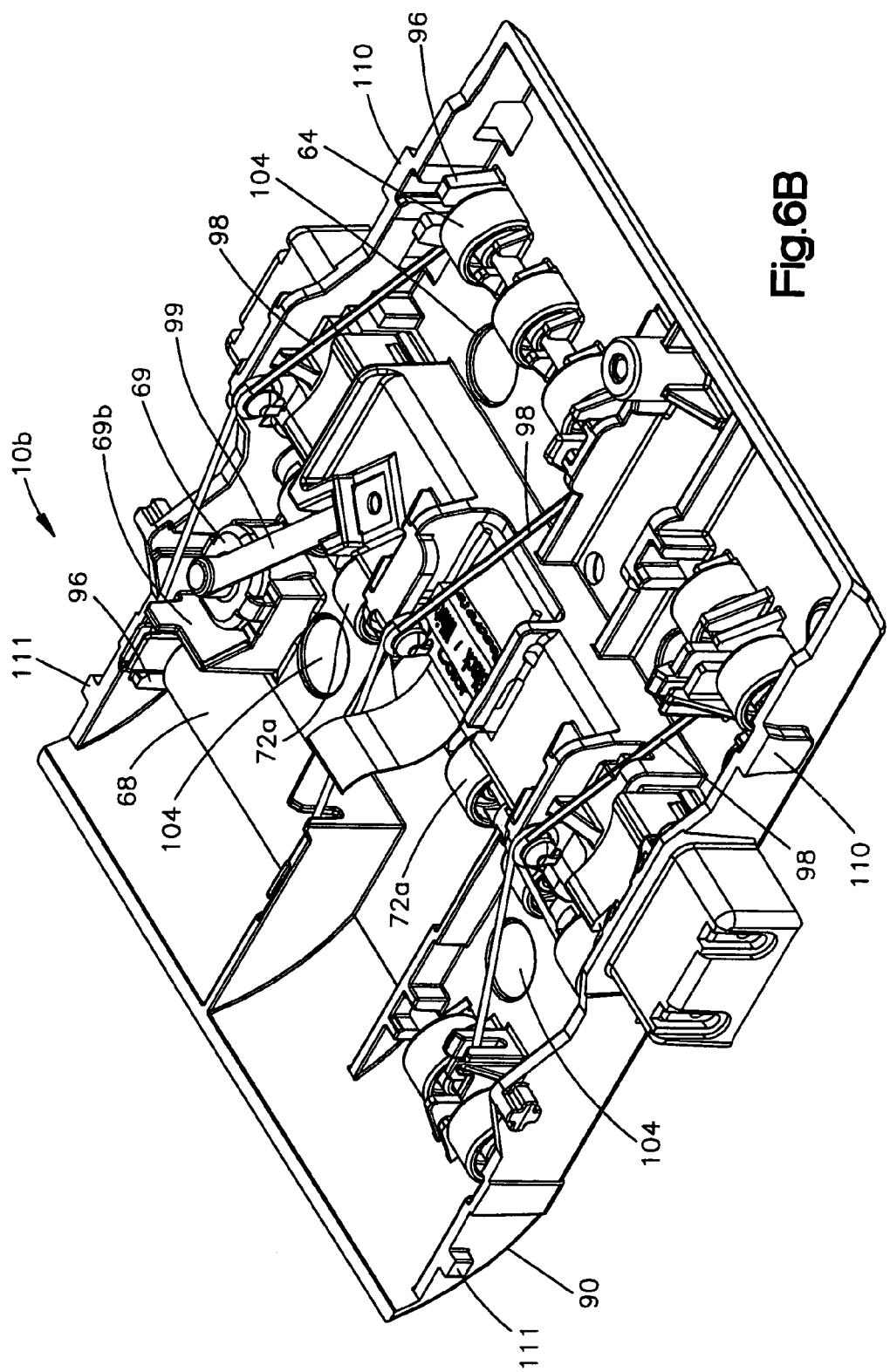
FIG. 6B is a perspective view of a pressure roller deck that forms part of a top cover assembly of the unit shown in FIGS. 3 and 4.

Referring to FIGS. 1 and 6B, a pressure roller 69a (See FIG. 1) also presses a check 14 into scanning contact with the optional MICR reader 44. The servo/stepper motor 50 is reversible so that a check/ID card may be reverse transported through the unit in order to re-scan the check/ID card or to discharge the check/ID card through the entry slot 20 rather than the exit slot.

Figure 4:
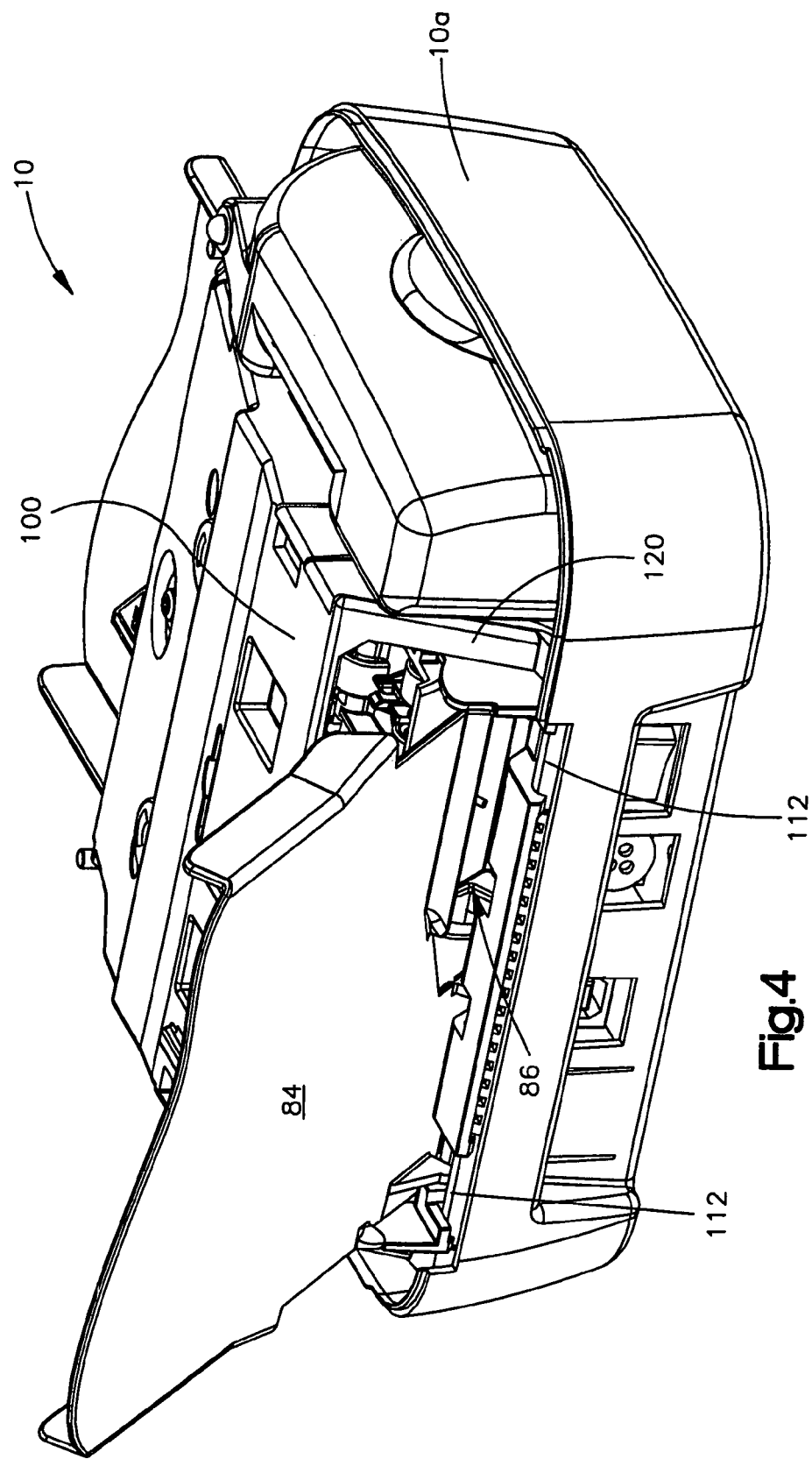
FIG. 4 is a rear perspective view of the scanner/imager shown in FIG. 3.
Figure 9:
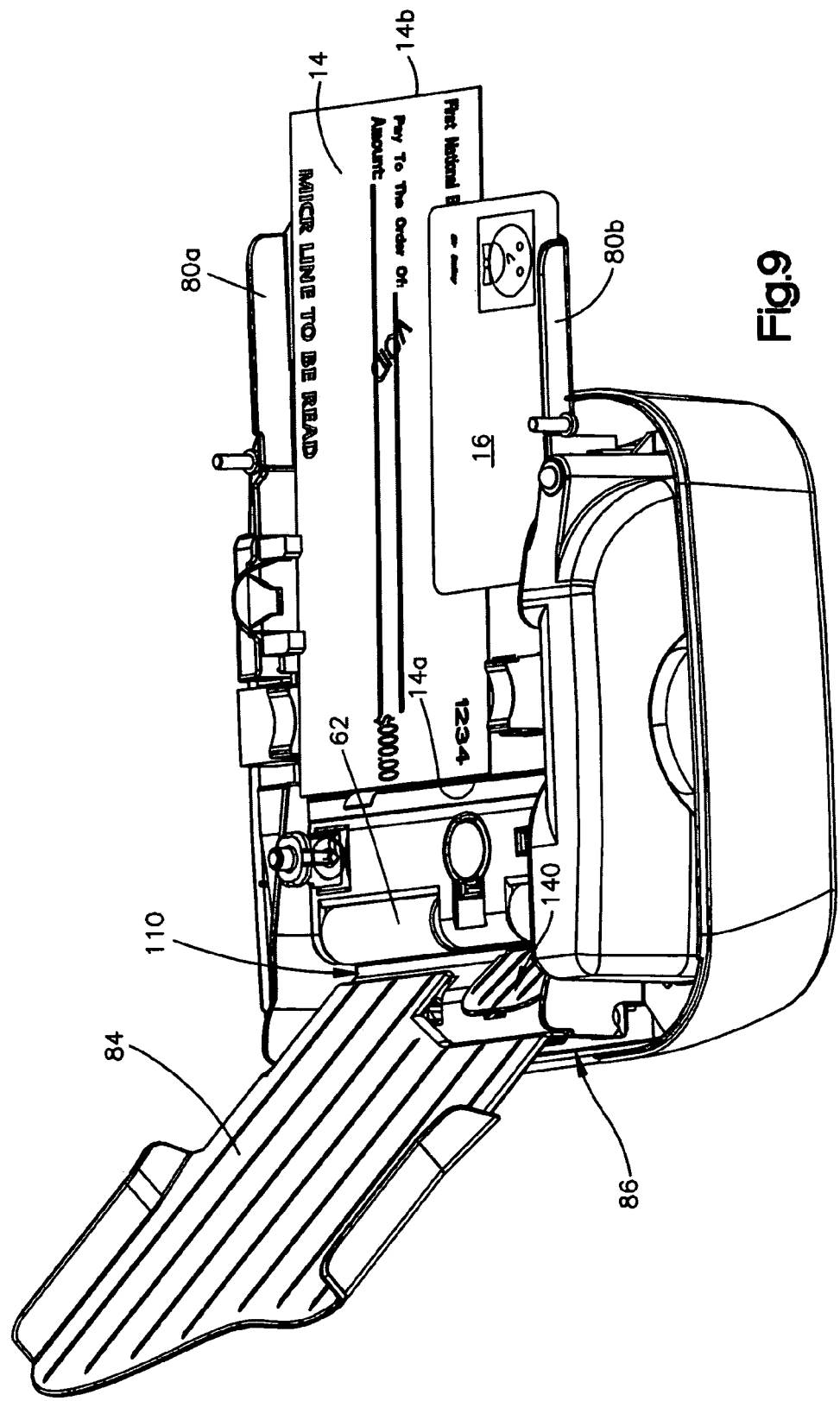
FIG. 9 is a side perspective view of the scanner/imager unit with the top cover assembly removed to show interior details.

FIGS. 3 and 4 illustrate an image/scanner 10 that incorporates the features disclosed and described in connection with the schematic representations shown in FIGS. 1 and 2. The unit shown in FIG. 3 includes an entrance guide 80 which helps direct a check and/or ID card into the entrance slot 20 that is defined between the cover 10b and base 10a. In FIGS. 2 and 9, both an ID card 16 and a check 14 are shown as entering the scanner/imager 10. In actual operation, either a check 14 or an ID card 16, but not both, is inserted into the unit. The guide 80 includes upstanding guide walls 80a, 80b which aid in the alignment of the check/ID card with the entry slot 20. As seen in FIG. 3, a check to be scanned is oriented so its right edge (as viewed in FIG. 3) abuts the guide wall 80a. An ID card, on the other hand, is oriented so its left edge abuts the guide wall 80b.

In the illustrated embodiment, the unit 10 also includes a discharge tray 84 for receiving and stacking checks 14 that are conveyed through the unit. As seen in FIG. 4, the unit 10 includes an opening defined generally by the reference character 86 which allows an ID card 16 (which is normally not bendable) to exit straight out the back of the scanner/imagery unit 10.

According to a feature of the invention, a check 14 inserted into the entry slot 20 tends to be automatically aligned so that its longitudinal axis is orthogonal to the drive roller 60. In accordance with this feature, the guide wall 80a is offset in the range of 0.25° to 3° with respect to the intended direction of movement of the check as it moves through the unit 10. In the illustrated construction, the guide wall 80a is offset by 0.25°. If the right edge of the check 14 is placed in abutting contact with the guide 80a as it is inserted into the unit, it has been found that as the check is engaged between the drive roller 60 and the pressure roller 64 (shown in FIG. 6) it tends to be rotated so that the longitudinal axis of the check D1 is coincident with the desired direction of travel F1 through the machine i.e. the longitudinal axis D1 of the check 14 is orthogonal to the axis of rotation of the drive roll 60. In effect, the check 14 pivots about a pivot point indicated by the reference character 86 which is a point where the inner end of the guide wall 80a joins the entry slot 20.

Figure 6C:
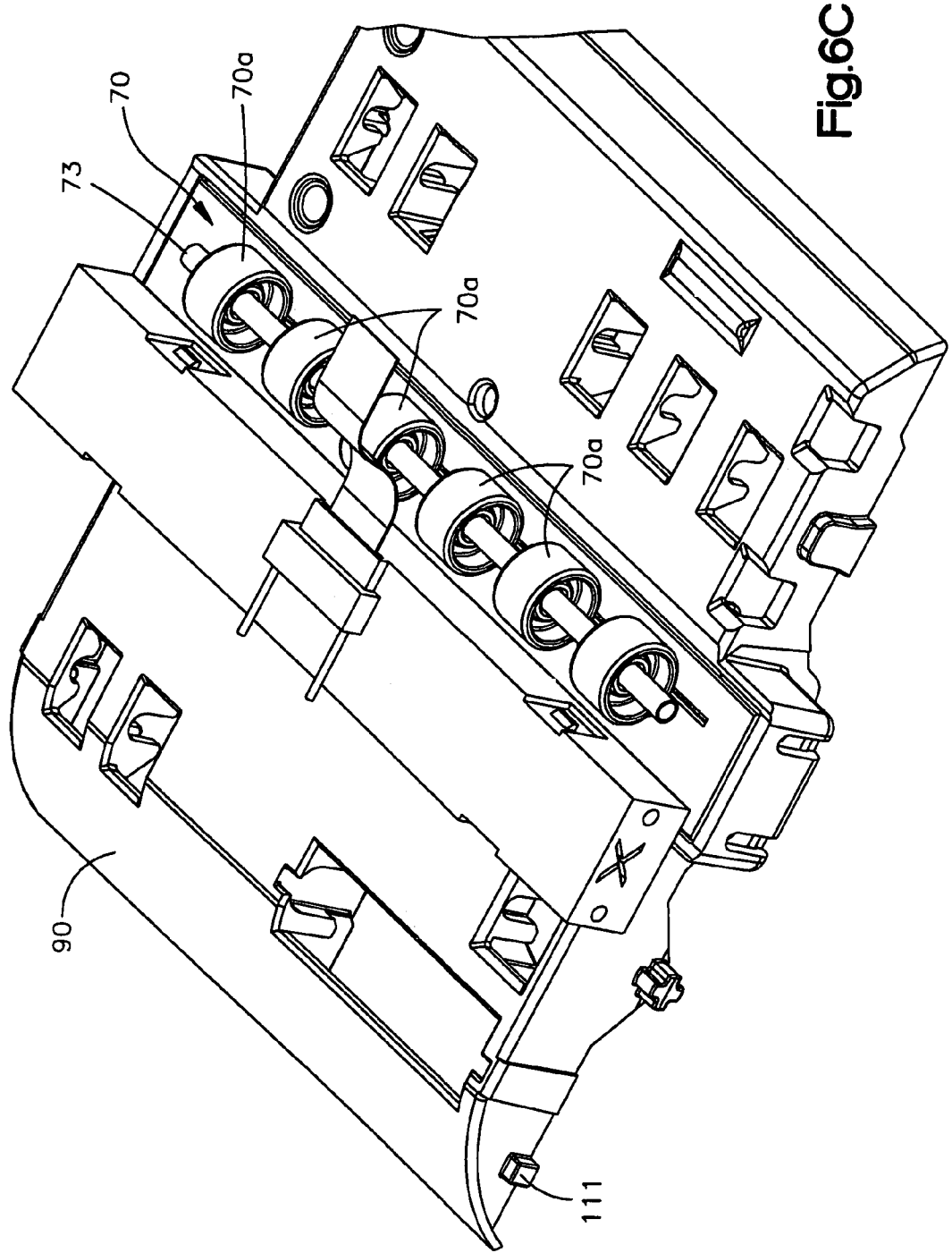
FIG. 6C is a perspective view of the underside of the pressure roller deck shown in FIG. 6B.
Figure 7:
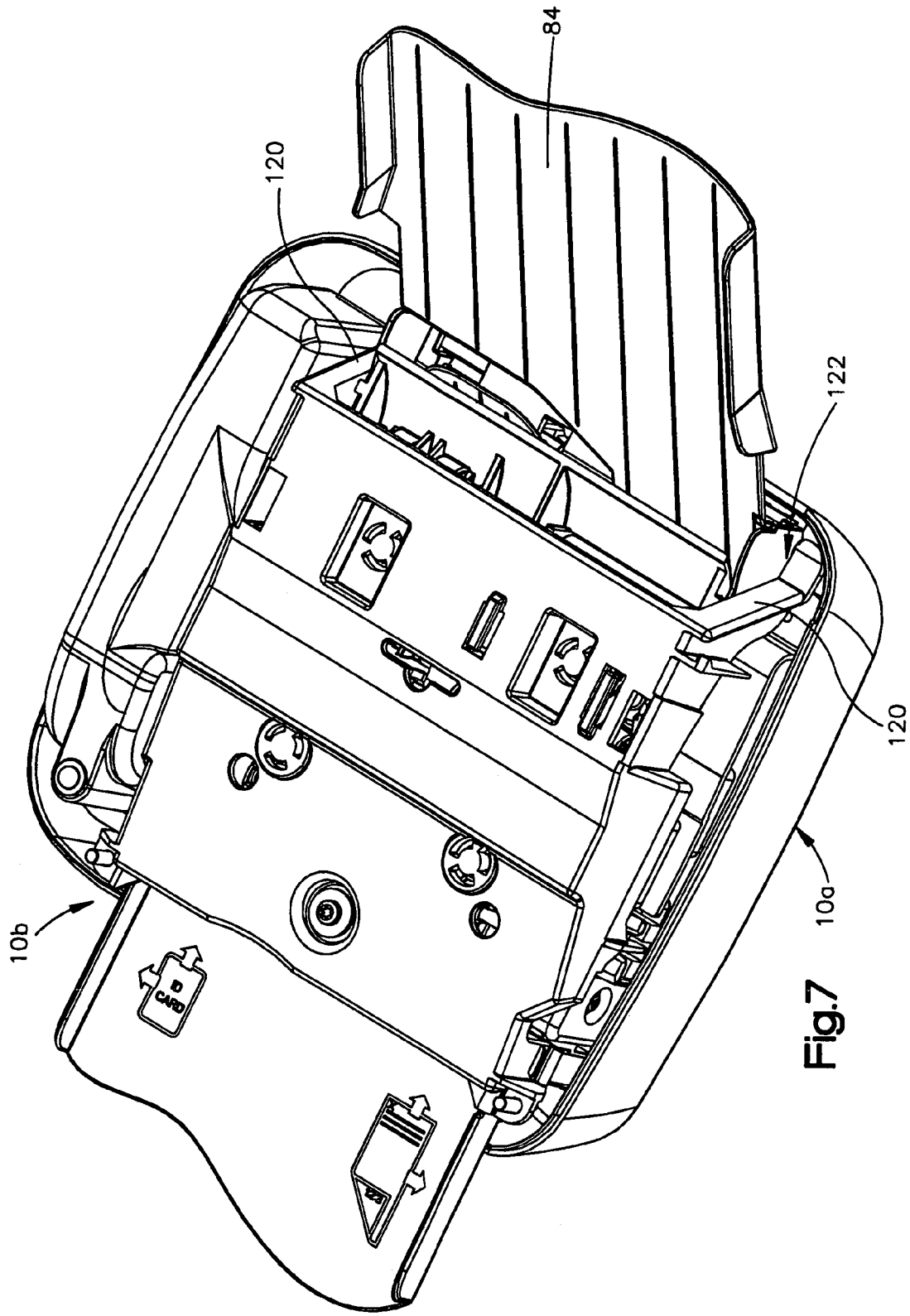
FIG. 7 is a fragmentary, perspective view of the scanner/imager with a top cover shell removed to show interior detail of the cover assembly.

Turning now to FIG. 6, the construction of the cover assembly 10b is illustrated. FIG. 6 illustrates an upper deck 90 that is loosely held within a cover shell 92. As a result, the deck 90 floats with respect to the base 10a and in particular, floats with respect to the lower deck 91 that forms part of the base 10a. Referring to both FIGS. 6 and 6B, the pressure rollers 64 and 68 are held in slot structure indicated generally by the reference character 96. The slot structure 96 allows the pressure rolls 64, 68 to move towards and away from their associated drive rollers 60, 62, respectively. The pressure roller 64 is urged towards pressure contact with its associated drive roller 60 by a plurality of springs 98, preferably wire-form springs. The pressure roller 68 is also urged into pressure contact with its associated drive roller 64 by opposite ends of the springs 98. The roller 72 which presses the item being scanned against the CIS 40, is rotatably supported on an axle shaft that is preferably formed from a garter spring 73. The ends of the garter spring 73 are captured in retaining structure 97 formed in the upper deck 90. The use of a garter spring as the axle for the pressure roll 72 allows individual rollers 72a to move independently of the other rollers as an item is being scanned. The "axle" urges each individual roller 72a into scanning contact with the CIS 40. A similar axle arrangement and gather spring 73 are preferably used with the pressure roller 70 which is rotatably mounted within the base 10a (see FIG. 6C).

The deck 91 also mounts the spring biased pressure roller 69 which is used to press a document against the optional MICR sensor 44 (shown in FIG. 2). Referring in particular to FIG. 6B (new) the upper deck 91 reciprocally mounts a pressure roller assembly 69 that includes the roller 69a (shown schematically in FIG. 1). The pressure roller assembly 69 is biased downwardly (as viewed in FIG. 6B) by a leaf spring 99. The pressure roller assembly 69 is mounted for reciprocating movement in a holder 69b forming part of the upper deck 91.

The cover assembly 10b includes an outer shell or lid 92 which is attached to an upper frame member 100. The upper frame member 100 rigidly supports the lid 92. The deck 90 is floatingly attached to the upper frame 100. To provide an overall downward bias for the deck 90 when the cover assembly 10a is closed, a plurality of coil springs 93 are held in associated pockets 104 defined in the deck 90. The coil springs 93 act between the pockets 104 and an underside of the upper frame 100 and apply a force to the deck 90 which urges it towards abutting contact with the lower deck 91 when the cover assembly 10a is closed. With the disclosed floating arrangement of the upper deck components, a parting or reveal line between the cover assembly 10b and base 10a, indicated generally by the reference character 106, remains uniform and constant regardless of the position of the upper deck 90 or the thickness of items conveyed through the unit 10.

Referring in particular to FIGS. 6 and 6B, the alignment or registration of the upper deck 90 with the lower deck 91 is achieved as follows. Referring in particular to FIG. 6B, the deck 90 includes a pair of integrally formed tabs or lugs 110 which are received in recesses or pockets defined by the lower deck 91, when the cover assembly 10b is closed. In addition, the deck includes integrally formed register pins 111 which engage and rest on lower frame segments 114, which form part of the base 10a (shown in FIG. 6D).

The cover assembly 10b is pivotally connected to the base 10a. In particular, the upper frame member 100 (shown in FIG. 6) includes a pair of spaced apart extension arms 120 (FIG. 4) which are releasably engageable with hinge structure defined by and carried within the base 10a and indicated generally by the reference character 122.

Figure 8:
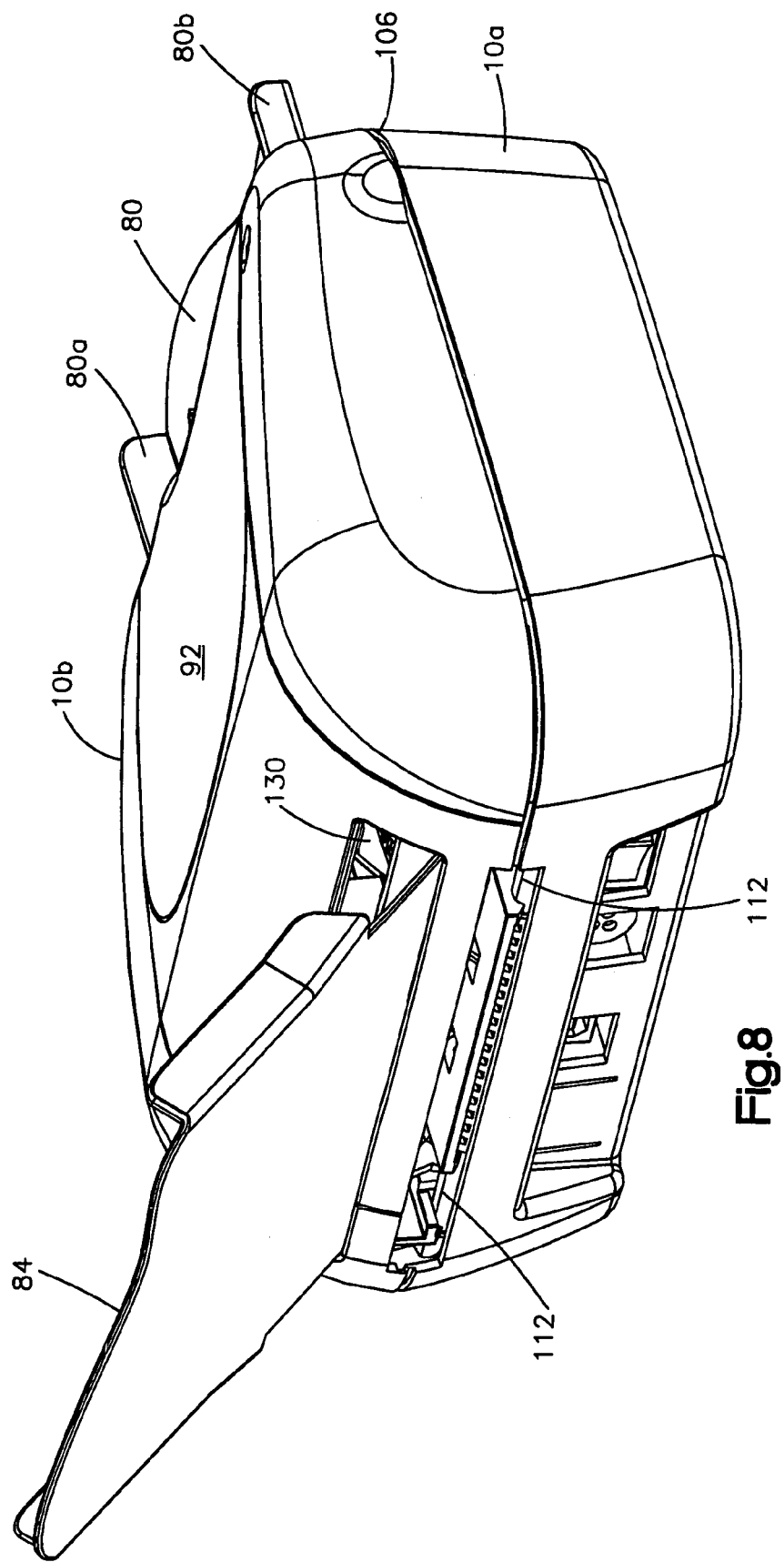
FIG. 8 is another perspective view of the scanner/imager showing primarily a rear portion of the unit.

According to a feature of the invention, the top cover assembly 10b can be rotated more than 100° with respect to the base 10a. Referring to FIG. 8, it can be seen that the check stacking tray 84 extends through an opening 130 in the lid 92. In accordance with a feature of the invention, although the cover assembly 10b can be rotated through a rather large arc, the exit tray 84 is limited to rotation in a smaller arc so that the cover assembly 10b can be opened while checks are stacked in the exit tray 84. This is achieved by configuring the opening 130 in the top cover assembly to provide clearance for the tray as well as providing an abutment or stop for the exit tray so that when the top cover is opened to a predetermined arc, i.e., 60°, the abutment preferably defined by the lower deck 91 prevents further movement in the exit tray 84. The opening 130 provides clearance between the tray and the cover so that the cover assembly 10b can continue to rotate to its fully open position, even though the exit tray 84 remains stationary after engaging the abutment.

FIG. 9 illustrates the path of movement for a check 14 and an ID card 16. When a check 14 is scanned by the imager/scanner 10, it preferably passes through the unit and is stacked in the exit tray 84. As should be apparent in FIG. 9, as the check is driven toward the left as viewed in FIG. 9, a leading edge 14a of the check 14 contacts the exit tray, and due the angular orientation of the tray, the leading edge 14a of the check is deflected upwardly. When the check fully exits the unit, a trailing edge 14b drops into a trough indicated generally by the reference character 110. The trough 110 is arranged such that multiple checks can be received and stacked in the exit tray 84 before being removed by an operator.

An ID card, on the other hand, is generally rigid and does not bend easily. Accordingly, an ID card is either discharged through the entry slot by reversing the transport direction or is discharged out the back of the machine through the slot or opening 86 defined by the check stacking tray 84.

Figure 5:
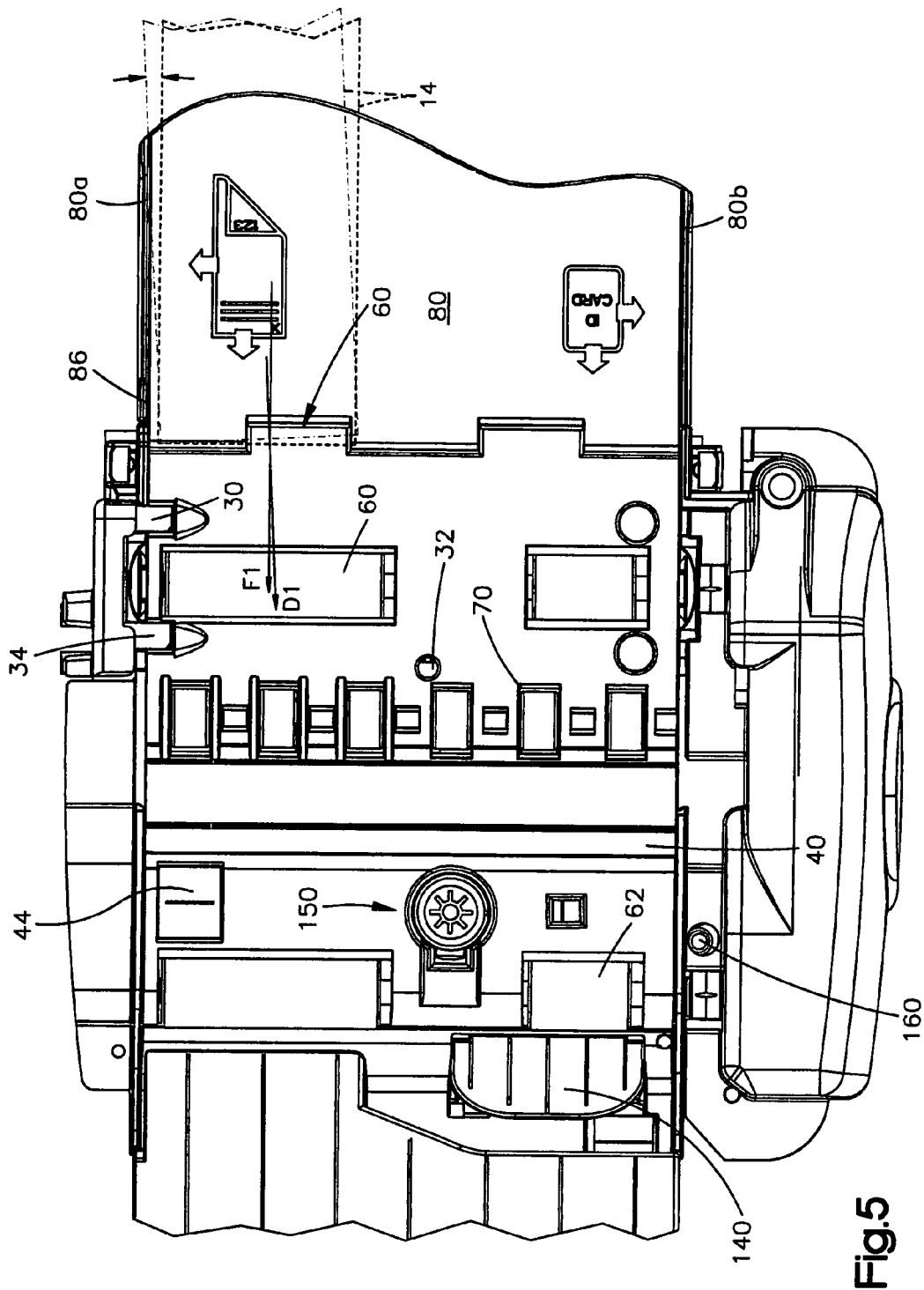
FIG. 5 is a fragmentary, top view of the scanner/imager with a top cover removed.

Referring to FIG. 5, a diverter 140 is located near the exit of the unit 10 and is pivotably movable to allow the unobstructed exit of a rigid card through the exit opening 86. The diverter or deflector 140 is pivotally mounted in an "over center" configuration so that its own weight tends to maintain the deflector 140 in an upper or deflecting position. The deflecting position is best shown in FIG. 9. In this position, a flexible document such as a check does not have sufficient rigidity to cause downward movement of the deflector 140 and, hence, the deflector aids in diverting the flexible document upwardly into the stacking tray 84. However, when a rigid document such as an ID card is scanned, its rigidity causes the deflector 140 to rotate downwardly against its weight bias, allowing the rigid document, i.e., ID card to exit directly out of the back of the machine through the slot 86. As a consequence of this feature, flexible documents such as checks can be easily stacked in the output tray during bulk processing without compromising the ability of the unit to handle rigid ID cards. Once the rigid document is discharged, the deflector 140 returns to its upper, deflecting position due to its weight biased mounting.

According to a feature of the invention, the scanner/imager unit 10 may include an ink stamp for "cancelling" or otherwise permanently marking a document that has been scanned to indicate that the document has been processed. Referring to FIGS. 2, 5, 12 and 13, in the preferred and illustrated embodiment, an ink stamp mechanism 150 is mounted to and forms part of the lower deck 91. As seen best in FIG. 2, after the document, i.e., check, passes the scan module 40, it passes over the ink stamp 150. According to the invention, if the document is to be stamped, it is paused at a predetermined position above the stamp and then the ink stamp is actuated to place indicia on the check.

Referring in particular to FIG. 12, the mechanism is shown in detail. In particular, the ink stamp 150 is mounted to the underside of the lower deck 91. A lever arm assembly 154 is also mounted to the underside of the deck 91. An electrically operated actuator or solenoid 156, mounted to the underside of the lower deck 91, is connected to one end of the lever arm 154. The opposite end of the lever arm is operatively connected to the ink stamp 150.

When the solenoid 156 is energized, a plunger 156a moves downwardly, pulling with it, one end 154a of the lever arm 154. The opposite end 154b of the lever arm pivots upwardly, thus causing the ink stamp 150 to move upwardly in order to contact and mark a document located above the ink stamp.

The ink stamp 150 is preferably of the self-inking type so that a separate ink supply is not required. When the ink is depleted, the ink stamp 150 is easily replaced. The ink stamp 150 is mounted for reciprocating movement in a holder 158 forming part of the lower deck 91.

Referring also to FIGS. 5 and 13, the ink stamp 150 is easily replaceable. In particular, an access opening 160 (shown in FIG. 5) is provided to manually depress, using a suitable implement such as a pen, the outboard end 154a of the lever 154. Inserting the implement into the hole 160, causes the downward movement of the lever end 154a which, in turn, causes the ink stamp 150 to be raised upwardly. The ink stamp element or module is best shown in FIG. 13.

According to the invention, the ink stamp 150 includes a laterally extending alignment lug 162 and a pair of grippers 164 engageable with associated bosses/pins formed on legs 166 that extend laterally from an inner end 154b of the lever 154. Referring also to FIG. 12A, to install an ink stamp 150 into the unit, the ink stamp 150 is oriented such that its lug 162 is placed in an installed position as the ink stamp is inserted into the holder 158. (The ink stamp 150 is inserted into the holder 158 from the top surface of the lower deck 91.) The ink stamp is then rotated 90° so that the alignment lug 162 is received in a slot 158a. As the ink stamp 150 is rotated, the grippers 164 engage pin/boss structure on the laterally extending legs 166, thus coupling the ink stamp 150 to the lever arm 154. Once coupled to the lever arm 154, the ink stamp 150 is held in its operative position. The engagement of the lug 162 with the slot 158a inhibits rotation of the ink stamp. As indicated above, activation of the solenoid 156 causes the upward movement of the ink stamp to place indicia on a document positioned above the ink stamp. To remove the ink stamp 150, the above described procedure is reversed.

According to a feature of the invention, the signals generated by the continuous image scanners 40, 42 are duplexed or multiplexed. By multiplexing the signals, both surfaces of the check/ID card can be scanned concurrently as the check/ID card moves through the unit. Consequently, only a single pass through the unit is required to fully scan both sides of the item.

The imaging data obtained by the scanners 40, 42 may result in a graphics file such as a "tiff" file. The invention, however, contemplates using software (or hardware) to retrieve text from the imaging data. Specifically, optical character recognition technology (OCR) can be used to recognize and retrieve textual information from the graphical data.

Figure 10:
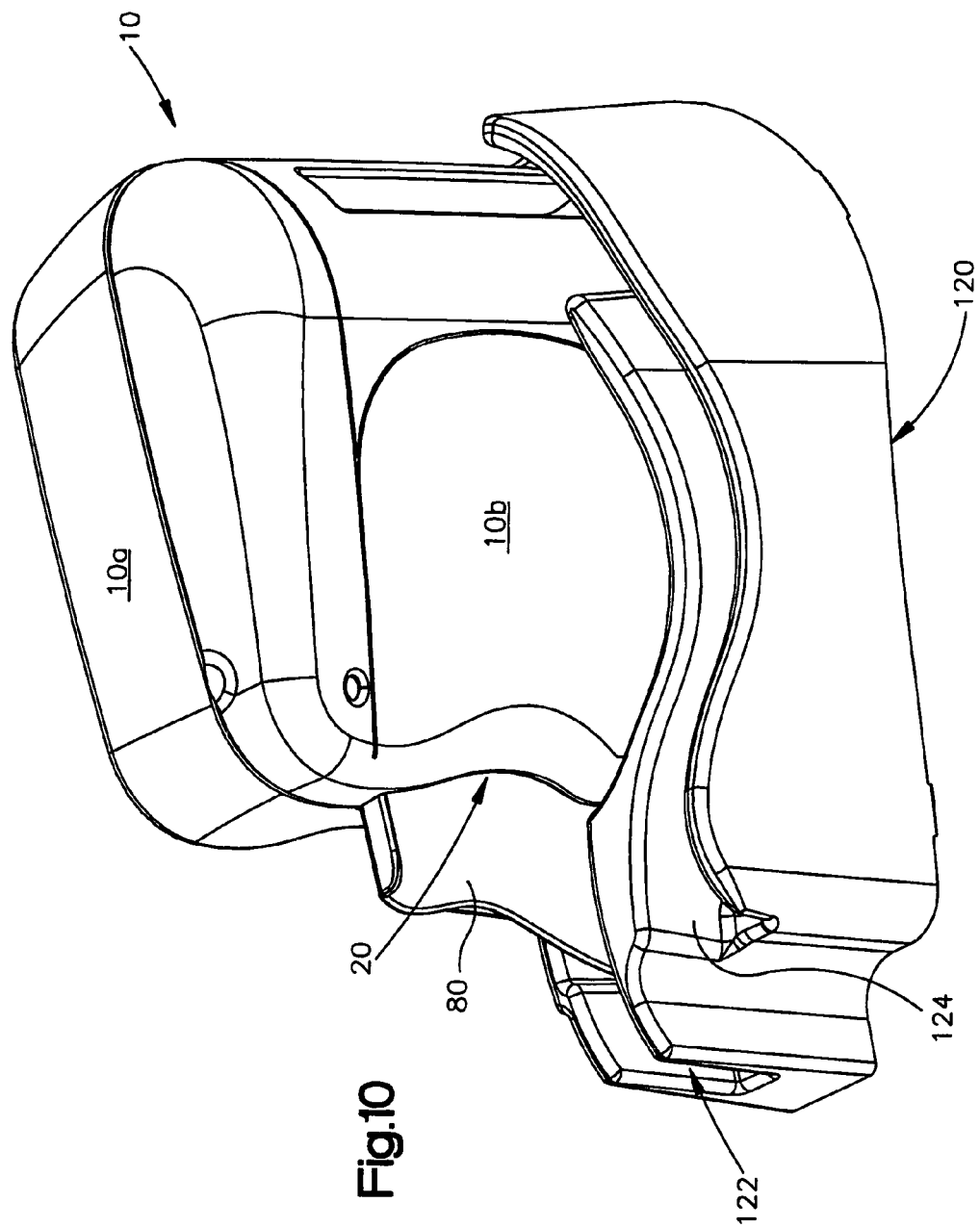
FIGS. 10 and 11 illustrate a scanner/imager assembly adapted to operate in a vertical orientation.
Figure 11:
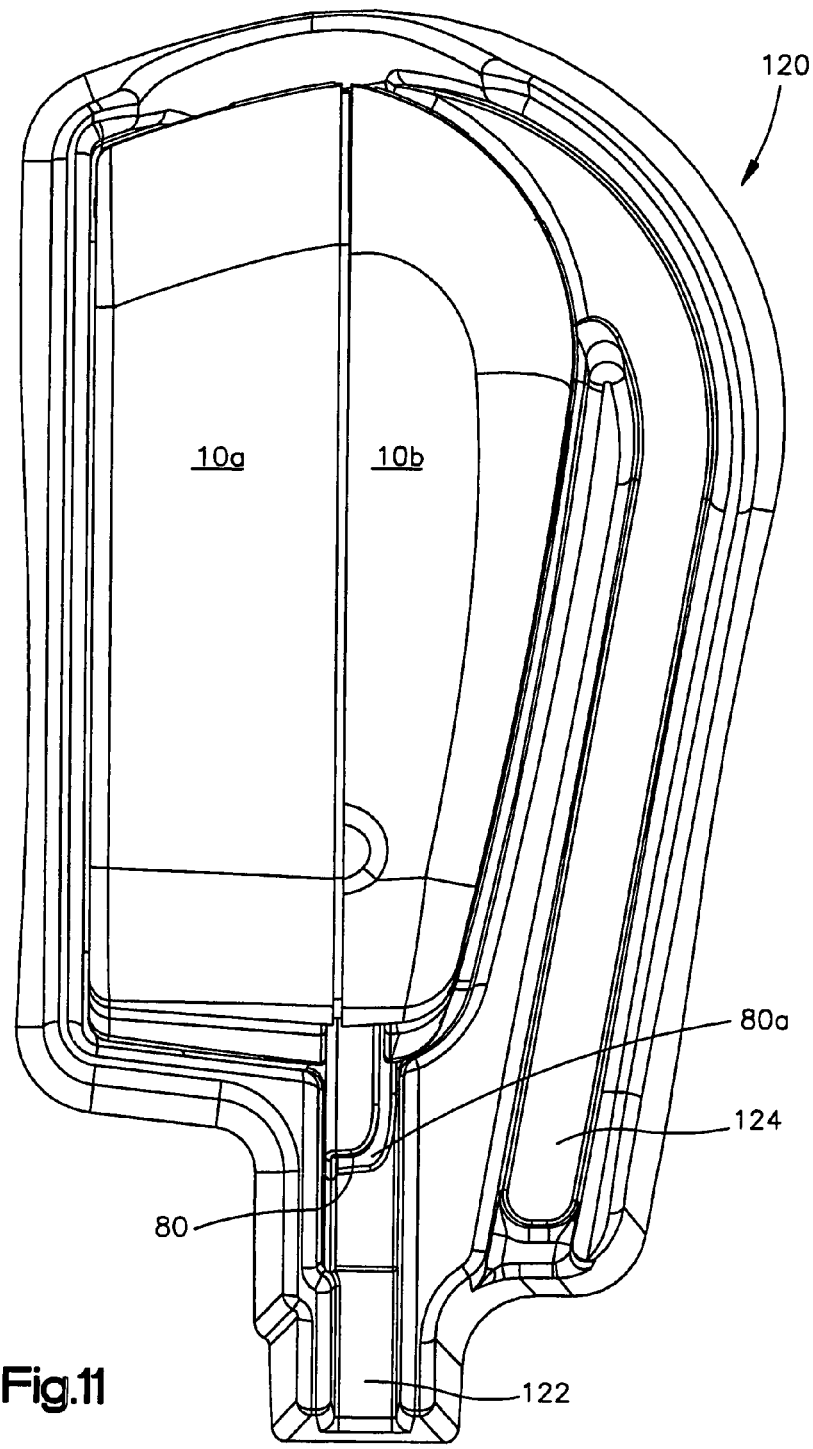

According to a feature of the invention, the scanner/imager 10 may be oriented vertically to, for example, reduce its footprint on a desktop. FIGS. 10 and 11 illustrate a vertical configuration for the imager/scanner 10. In the preferred and illustrated embodiment, the scanner 10 includes a cradle indicated generally by the reference character 120 which defines an entry slot 122 and an exit slot 124. In the illustrated configuration, the unit 10 is intended to scan bendable, sheet documents such as checks. In this configuration, an operator inserts a check into the slot 122 and into the guide 80 from where it enters the unit 10 through the entry slot 20, i.e., is engaged by the driver roller 60/pressure roller 64 assembly. The check is transported in a vertical plane through the vertically corrected scan region and is discharged into the exit slot 124 from where it drops into a receptacle or into an operator's hand.

Additional features and details of the invention can be found in the appendix attached hereto.

Although the foregoing has been described in conjunction with a preferred embodiment, it is to be appreciated that various modifications may be made without departing from the spirit and scope of the invention as defined by the appended claims.

Having described the invention, we claim the following:

1. Apparatus for scanning documents such as ID cards and bank checks, comprising:
   a) a cover assembly and a base assembly hingedly connected on one end to provide a clam shell type configuration;
   b) said base assembly including at least one motor driven roller for conveying a document to be scanned along a paper path defined between said cover assembly and said base assembly;
   c) said cover assembly including at least one pinch roller associated with said driver roller, said pinch roller configured to abuttingly contact said drive roller when said cover assembly is placed in a closed position whereby said document to be scanned is gripped and driven through said paper path;

d) said paper path defining two side-by-side scanning regions, one of said regions configured to scan flexible documents such as bank checks, the other of said regions configured to scan rigid media such as ID cards;

e) a plurality of sensors located in said scan regions and operative to detect the position of documents being scanned in said regions.

2. The apparatus of claim 1 wherein at least one of said scan regions includes a MICR reader for reading MICR characters on a document.

3. The apparatus of claim 1 wherein said apparatus includes a plurality of drive rollers located in said base assembly and a plurality of associated pinch rollers rotatably mounted in said cover assembly, said pinch rollers engageable with said associated driver rollers when said cover assembly is moved to a closed position.

4. The apparatus of claim 3 wherein said plurality of said pinch rollers form part of a floating deck assembly carried by a cover structure forming part of said cover assembly including biasing elements for urging said deck assembly towards said base assembly when said cover is in a closed position.

5. The apparatus of claim 1 further including a weight biased diverter located in said second scan path, said diverter movable to a retracted position by a relatively rigid document in order to expose an exit slot to allow side rigid document to exit said apparatus through said slot.

6. The apparatus of claim 1 wherein at least one of said scan regions includes an ink stamp mechanism operative to imprint a document with predetermined indicia, as said document proceeds through said apparatus.

7. The apparatus of claim 6 wherein said ink stamp medium includes an ink stamp that is reciprocally mounted in said base assembly and includes an actuator for producing reciprocating movement in said ink stamp.

8. The apparatus of claim 7 wherein said ink stamp is a replaceable, self-inking element.

9. The apparatus of claim 1 including an entrance for guiding the entry of a document to be scanned, said entrance guide including a guide wall that is offset with respect to the direction of movement of said document through said scanner at an angle in the range of 0.25° to 3°.

10. The apparatus of claim 9 wherein said offset is substantially 0.25°.

11. The apparatus of claim 1 further comprising an exit tray that is arranged to maintain its operative position whether said cover assembly is in a closed or open position.

12. The apparatus of claim 1 further comprising communication ports for communicating data to and receiving data from a host.

13. The apparatus of claim 1 further including scan modules mounted in said cover assembly and said base assembly whereby both sides of a document can be scanned in a single pass through the apparatus.

14. The apparatus of claim 12 wherein image data received from said scan modules is multiplexed.

15. The apparatus of claim 1 wherein said driver roller is driven by a reversible motor whereby a document can be discharged through an input side of said apparatus after it has been scanned, by reversing rotation of said drive roller.

16. The apparatus of claim 1 further comprising cradle structure for positioning said apparatus in a vertical orientation whereby said scan regions are located in a substantially vertical plane.

17. Apparatus for scanning and imaging documents such as ID cards and bank checks, comprising:

a) an interconnected cover assembly and a base assembly, said cover assembly movable between open and closed positions;

b) said base assembly including a plurality of driver rollers for conveying a document to be scanned along a paper path defined between said cover and said base assembly when said cover assembly is in a closed position;

c) a reversible drive motor for concurrently driving said driver rollers in said base assembly;

d) said cover assembly including a cover member and mounting a floating deck assembly, said deck assembly including a plurality of pinch rollers associated with said drive rollers such that when said cover assembly is closed, said pinch rollers confrontingly engage associated drive rollers, said cover assembly further including biasing elements acting between said cover member and said deck assembly for urging said deck assembly toward said base assembly when said cover assembly is in a closed position;

e) a plurality of sensors for monitoring the position of the document being scanned along said paper path.

18. The apparatus of claim 17 further including an ink stamp mechanism located in said base assembly for imprinting a document with an indicia when said document is in said paper path.

19. The apparatus of claim 17 wherein said paper path defines two adjacent scanning regions, one of said regions adapted to scan flexible documents such as bank checks, the other of said regions adapted to scan rigid documents such as ID cards.

20. The apparatus of claim 18 wherein said ink stamp mechanism includes a replaceable self-inking ink module that includes gripper elements for releasably engaging a lever arm forming of said ink stamp mechanism.

21. The apparatus of claim 17 wherein said reversible motor is operative to discharge said document through an input side of said apparatus under predetermined operating conditions.

* * * * *